US010012450B2

(12) United States Patent
Riendeau

(10) Patent No.: US 10,012,450 B2
(45) Date of Patent: Jul. 3, 2018

(54) HEAT EXCHANGER ELEMENT AND METHOD FOR THE PRODUCTION

(71) Applicant: Westwind Limited, London (GB)

(72) Inventor: Marcel Riendeau, Lich (DE)

(73) Assignee: WESTWIND LIMITED, London (GB)

( * ) Notice: Subject to any disclaimer, the term of this patent is extended or adjusted under 35 U.S.C. 154(b) by 108 days.

(21) Appl. No.: 13/744,917

(22) Filed: Jan. 18, 2013

(65) Prior Publication Data

US 2013/0269906 A1    Oct. 17, 2013

(30) Foreign Application Priority Data

Jan. 20, 2012    (EP) .................................... 12000365

(51) Int. Cl.
| | |
|---|---|
| F28D 20/02 | (2006.01) |
| F28F 3/04 | (2006.01) |
| F28F 21/06 | (2006.01) |
| F28F 21/08 | (2006.01) |
| B23P 15/26 | (2006.01) |
| F28D 9/00 | (2006.01) |
| F28D 21/00 | (2006.01) |

(52) U.S. Cl.
CPC ............. *F28D 20/02* (2013.01); *B23P 15/26* (2013.01); *F28D 9/00* (2013.01); *F28D 20/025* (2013.01); *F28D 21/0014* (2013.01); *F28D 21/0015* (2013.01); *F28F 3/042* (2013.01); *F28F 21/065* (2013.01); *F28F 21/08* (2013.01); *Y02E 60/145* (2013.01); *Y10T 29/4935* (2015.01)

(58) Field of Classification Search
CPC ....... F28D 9/00; F28D 21/0015; B01D 63/08; B01D 63/081; B01D 69/06

USPC ................ 165/10, 165, 166; 96/4–14, 43–56
See application file for complete search history.

(56) References Cited

U.S. PATENT DOCUMENTS

| | | | |
|---|---|---|---|
| 2,798,892 A | | 7/1957 | Penberthy |
| 3,220,960 A | | 11/1965 | Wichterle et al. |
| 3,573,158 A | | 3/1971 | Pall et al. |
| 3,682,028 A | | 8/1972 | Clayton et al. |
| 3,698,222 A | * | 10/1972 | Blake ..................... B21D 28/36 72/129 |

(Continued)

FOREIGN PATENT DOCUMENTS

| | | |
|---|---|---|
| CA | 2 826 995 | 8/2012 |
| CA | 2 798 892 | 7/2013 |

(Continued)

OTHER PUBLICATIONS

Takuya, JP2005282907TRANS (English Translation), Oct. 2005.*
Sadao, JP2009052873TRANS (English Translation), Mar. 2009.*

*Primary Examiner* — Justin Jonaitis
*Assistant Examiner* — Eric Ruppert
(74) *Attorney, Agent, or Firm* — Leason Ellis LLP

(57) ABSTRACT

To provide heat exchanger elements which allow the creation of Enthalpy exchangers whereby the efficiency of sensible energy exchange and latent energy exchange can be varied and controlled and especially improved, a method for the production of heat exchanger elements is provided including
 a) producing a plate element with defined outer dimensions and corrugations in the area within a border,
 b) perforating the plate in predefined areas and in predefined dimensions,
 c) filling the perforations with a polymer with latent energy recovery capability and
 d) curing the polymer.

27 Claims, 1 Drawing Sheet

(56) References Cited

U.S. PATENT DOCUMENTS

| | | | |
|---|---|---|---|
| 3,847,211 A * | 11/1974 | Fischel | B01D 53/22 165/166 |
| 3,993,517 A * | 11/1976 | Schneider | 216/54 |
| 4,247,498 A | 1/1981 | Castro | |
| 4,460,388 A * | 7/1984 | Fukami et al. | 55/521 |
| 4,744,414 A | 5/1988 | Schon | |
| 4,807,588 A * | 2/1989 | Bentley et al. | 126/110 R |
| 4,925,732 A | 5/1990 | Driskill et al. | |
| 4,927,535 A | 5/1990 | Beck et al. | |
| 5,039,418 A | 8/1991 | Schucker | |
| 5,069,276 A * | 12/1991 | Seidel | F28D 9/0037 165/166 |
| 5,120,813 A | 6/1992 | Ward, Jr. | |
| 5,869,412 A | 2/1999 | Yenni, Jr. et al. | |
| 5,897,925 A | 4/1999 | Huang et al. | |
| 6,013,376 A | 1/2000 | Yenni, Jr. | |
| 6,032,730 A | 3/2000 | Akita et al. | |
| 6,033,771 A | 3/2000 | Heffelfinger | |
| 6,133,168 A | 10/2000 | Doyle et al. | |
| 6,145,588 A | 11/2000 | Martin et al. | |
| 6,228,506 B1 | 5/2001 | Hosatte et al. | |
| 6,233,824 B1 * | 5/2001 | Dobbs | F28D 9/04 165/164 |
| 6,410,465 B1 | 6/2002 | Lim et al. | |
| 6,413,298 B1 | 7/2002 | Wnek et al. | |
| 6,635,104 B2 | 10/2003 | Komkova et al. | |
| 6,675,705 B2 | 1/2004 | Yamamoto et al. | |
| 6,684,943 B2 | 2/2004 | Dobbs et al. | |
| 6,706,413 B2 | 3/2004 | Bohringer et al. | |
| 6,737,158 B1 | 5/2004 | Thompson | |
| 6,841,601 B2 * | 1/2005 | Serpico et al. | 524/261 |
| 6,951,242 B1 | 10/2005 | Des Champs et al. | |
| 6,953,510 B1 | 10/2005 | MacKay et al. | |
| 7,128,138 B2 | 10/2006 | Des Champs | |
| 7,152,670 B2 | 12/2006 | Dobbs et al. | |
| 7,320,361 B2 | 1/2008 | Arai et al. | |
| 7,386,924 B2 | 6/2008 | Muth et al. | |
| 7,459,085 B2 | 12/2008 | Koguma et al. | |
| 7,572,321 B2 | 8/2009 | Yamakawa et al. | |
| 7,635,513 B1 | 12/2009 | Hoshuyama et al. | |
| 7,737,224 B2 | 6/2010 | Willis et al. | |
| 7,837,912 B2 | 11/2010 | Bristow et al. | |
| 8,012,539 B2 | 9/2011 | Handlin, Jr. et al. | |
| 8,283,029 B2 | 10/2012 | Jones et al. | |
| 8,550,151 B2 | 10/2013 | Murayama et al. | |
| 8,607,851 B2 | 12/2013 | Takada et al. | |
| 8,936,668 B2 | 1/2015 | Huizing et al. | |
| 9,194,630 B2 | 11/2015 | Mariotto et al. | |
| 9,255,744 B2 | 2/2016 | Huizing | |
| 9,429,366 B2 | 8/2016 | Dubois | |
| 9,517,433 B2 | 12/2016 | Huizing et al. | |
| 9,562,726 B1 | 2/2017 | Eplee | |
| 2001/0004500 A1 * | 6/2001 | Grasso | H01M 8/04119 429/425 |
| 2003/0035943 A1 | 2/2003 | Jones et al. | |
| 2003/0106680 A1 | 6/2003 | Serpico et al. | |
| 2004/0140085 A1 * | 7/2004 | Dobbs et al. | 165/166 |
| 2006/0051530 A1 | 3/2006 | Schwarz et al. | |
| 2006/0162563 A1 * | 7/2006 | Poschmann | 96/9 |
| 2006/0168813 A1 | 8/2006 | Arai et al. | |
| 2006/0229373 A1 | 10/2006 | Guerra et al. | |
| 2007/0021569 A1 | 1/2007 | Willis et al. | |
| 2007/0095514 A1 | 5/2007 | Inoue et al. | |
| 2007/0163433 A1 * | 7/2007 | Chen | B01D 19/0031 95/46 |
| 2008/0085437 A1 | 4/2008 | Dean et al. | |
| 2008/0128941 A1 | 6/2008 | Lopez et al. | |
| 2008/0210625 A1 | 9/2008 | Mitchell et al. | |
| 2008/0308262 A1 | 12/2008 | Sauer et al. | |
| 2009/0098352 A1 | 4/2009 | Wittmann et al. | |
| 2009/0098432 A1 | 4/2009 | Rosenberg et al. | |
| 2009/0314480 A1 * | 12/2009 | Grinbergs et al. | 165/174 |
| 2010/0032145 A1 | 2/2010 | Lee | |
| 2011/0146941 A1 | 6/2011 | Benoit et al. | |
| 2011/0192579 A1 | 8/2011 | Sotokawa et al. | |
| 2011/0230614 A1 | 9/2011 | Handlin, Jr. et al. | |
| 2011/0259572 A1 * | 10/2011 | Muratani et al. | 165/185 |
| 2012/0071575 A1 | 3/2012 | De Rosa et al. | |
| 2012/0073791 A1 | 3/2012 | Dubois | |
| 2012/0205081 A1 | 8/2012 | Terai et al. | |
| 2013/0052735 A1 | 2/2013 | De Rosa et al. | |
| 2014/0014289 A1 | 1/2014 | Tan | |
| 2014/0030495 A1 | 1/2014 | Cartier et al. | |
| 2014/0033924 A1 | 2/2014 | Klingenburg et al. | |
| 2014/0363600 A1 | 12/2014 | Dooley et al. | |
| 2015/0000863 A1 | 1/2015 | Klingenburg et al. | |

FOREIGN PATENT DOCUMENTS

| | | |
|---|---|---|
| CN | 102232015 | 11/2011 |
| DE | 34 30 204 | 2/1986 |
| DE | 19853526 A1 | 5/2000 |
| DE | 10 2006 004 513 | 8/2007 |
| DE | 10 2010 052 059 | 5/2012 |
| DE | 102011010651 A1 | 8/2012 |
| DE | 102011105926 A1 | 1/2013 |
| DE | 10 2011 110 862 | 2/2013 |
| EP | 0012491 A1 | 6/1980 |
| EP | 0529801 B1 | 3/1996 |
| EP | 0720720 B1 | 1/1998 |
| EP | 0666973 B1 | 2/1998 |
| EP | 0560630 B1 | 11/1998 |
| EP | 1312870 A2 | 5/2003 |
| EP | 1 873 470 | 1/2008 |
| EP | 1713853 B1 | 8/2008 |
| EP | 2 053 335 | 4/2009 |
| EP | 2169339 | 3/2010 |
| EP | 2435171 A1 | 4/2012 |
| GB | 2417315 A | 2/2006 |
| JP | 58-124196 A | 7/1983 |
| JP | 58-124521 A | 7/1983 |
| JP | 08219676 | 8/1996 |
| JP | 2005282907 | * 10/2005 |
| JP | 2009052873 | * 3/2009 |
| WO | WO 9509338 | 4/1995 |
| WO | WO 97/03324 | 1/1997 |
| WO | WO 2000069615 A2 | 11/2000 |
| WO | WO 01/27552 | 4/2001 |
| WO | WO 2002009850 A2 | 2/2002 |
| WO | WO 02/072242 | 9/2002 |
| WO | WO 02/072242 A1 | 9/2002 |
| WO | WO 02/072242 A1 | 9/2002 |
| WO | WO 2005012402 A1 | 2/2005 |
| WO | WO 2005014276 A1 | 2/2005 |
| WO | WO 2007/116567 | 10/2007 |
| WO | WO 2008/037079 | 4/2008 |
| WO | WO 2008/037079 A1 | 4/2008 |
| WO | WO 2008089484 A1 | 7/2008 |
| WO | WO 2009137678 A1 | 11/2009 |
| WO | WO 2010132983 A1 | 11/2010 |
| WO | WO 2012050860 A1 | 4/2012 |
| WO | WO 2012107156 A1 | 8/2012 |
| WO | WO 2013/091099 | 6/2013 |
| WO | WO 2014011535 A1 | 1/2014 |
| WO | WO 2014043011 A1 | 3/2014 |
| WO | WO 2014/098375 | 6/2014 |

* cited by examiner

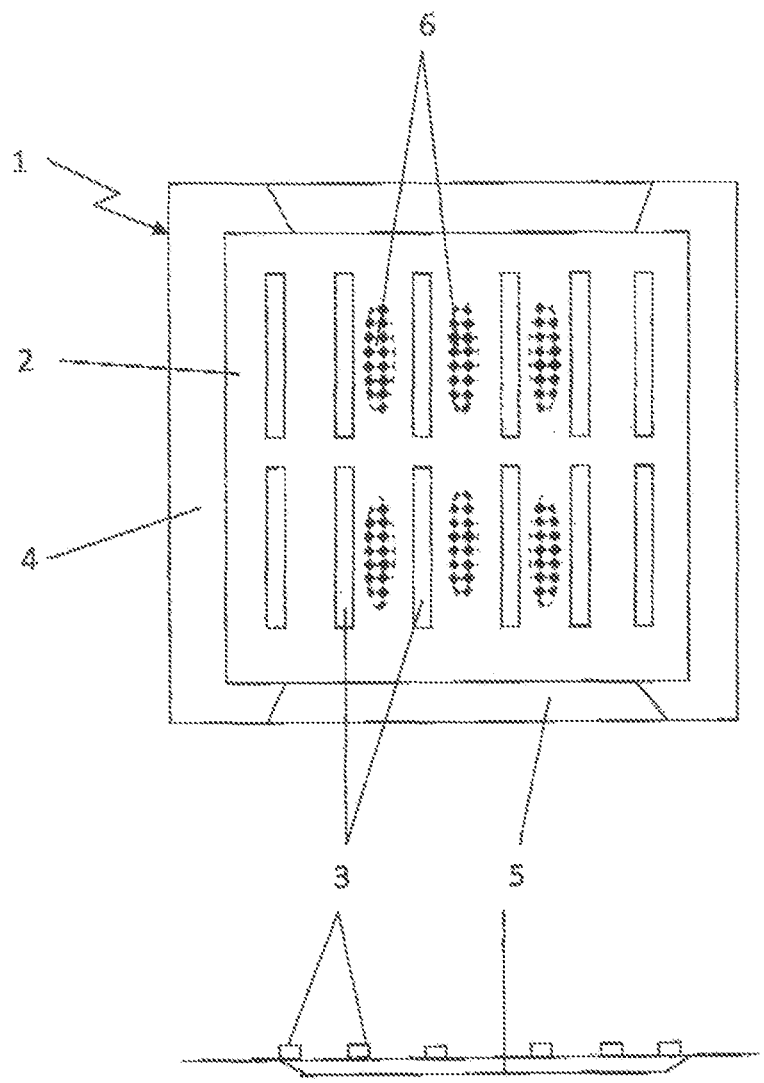

HEAT EXCHANGER ELEMENT AND METHOD FOR THE PRODUCTION

The present invention refers to heat exchanger elements. Furthermore, the invention discloses a method for the production of heal exchanger elements. Finally, the invention refers to a heat exchanger including inventive heat exchanger elements.

It is state of the art to use different kinds of heat exchangers for different purposes. Usually, heat exchangers are used to recover heat energy from one fluid or medium into another one. This kind of heat energy is celled sensible energy. The heat energy or sensible energy of one fluid, normally air, is recovered into another one which is running adjacent, e.g. parallel, counter or cross flow, to the first where the fluid is at lower temperature. By reversing fluid flows, the exchange between the two will generate a cooler fluid. Heat exchangers used for sensible energy recovery are usually made of metal or plastic plates. There are different types as there can be cross flow, parallel flow or counter flow configurations. The plates are defining flow channels between themselves so that the fluids can flow between the plates. Such devices are e. g. used in residential and commercial ventilation (HRV).

Another type of energy exchangers refers to the so called latent energy which is the moisture. To exchange the latent energy it is known to use desiccant coated metal or plastic substrates or membranes made from desiccant impregnated cellulose or polymer. Between plates made from cellulose or polymer, air passages are defined or created to allow the fluids to pass along the surface of the plates, thereby transferring moisture from one fluid to the other one. As the membranes usually nave no structural strength, it is known to combine the membranes with frames or grids which thereby define spacings between the membranes.

In case of a combination of the above, the energy exchangers are called Enthalpy exchanger. Those Enthalpy exchangers allow for the exchange of sensible and latent energy, resulting in Total Energy recovery.

Membrane materials as currently available are delivered by the roll. The membrane material is the most critical part of an Enthalpy exchanger. The membrane material must be fixed and sealed to a kind of grid or frame and arranged in a way to allow for a fluid to flow between each membrane layer. So, it is obvious that Enthalpy exchangers of the known art are a compromise. They will usually lose in sensible energy to gain in latent energy as a result of the selective scope and characteristics of currently used membranes.

Such a heat exchanger built from respective elements is e. g. WO 02/072242 A1. On grids respective membranes made of fibres are positioned. The grids are stapled thereby altering the direction of the plates in order to create different air flow directions.

In view of the mentioned state of the art it is an object of the invention to provide heat exchanger elements and heat exchangers as well as a method for the production of heat exchanger elements. The inventive heat exchanger elements allows for the creation of Enthalpy exchangers whereby the efficiency of sensible energy exchange and latent energy exchange can be varied and controlled and especially improved.

With the invention, the solution of the above mentioned object is presented by a method for the production of heat exchanger elements according to claim 1. With regard to the heat exchanger element, the object is solved by an element with the features of claim 11. A heat exchanger is claimed in claims 18. Improvements and further features are disclosed in the subclaims.

According to the invention, a new hybrid exchanger element is provided which on one hand has enough structural strength and density to create air flow channels for any type of cross flow and/or counter flow energy exchanger, thereby allowing for the use of a structurally strong materiel which is good for sensible energy exchange, on the other hand by size and number of perforations or openings or holes it is possible to define an area which is filled with a polymer solution with latent energy exchange characteristics. It is obvious that the efficiency of sensible energy exchange on one hand and latent energy exchange on the other hand can be defined, controlled and adapted to the respective needs of the environment (dry air, humidity, outside temperature and the like).

According to the invention, a plats element can be made of aluminium or plastic or combinations thereof. The element can be provided with corrugations. Corrugations can be designed to optimize the efficiency to pressure drop ratio. The corrugations can be chosen to allow for creating flow channels between similar plates when those are stacked together. By the definition of ids corrugation, one advantage will be the enhancement of the surface which is available for energy transfer. This can be built up as large as possible and can even reach an increase of 100% and more. Furthermore, the corrugations can be designed in a way to allow for the easy arrangement of counter flow or cross flow configurations, e. g. by choosing oriented corrugations and alternating the position of the plate.

The border of the plate defines an area where similar plates can be fixed together in an appropriate way. This can be welding, e. g. laser welding, ultra sound welding and/or folding, crimping and the like. This stabilises the rigidity of the package as well as allows to build up the desired flow channels. The herder area can be flattened, tongue/groove system, profiled or rimmed to allow for a tight sealable connection between plates.

The perforations can be performed at the time of the plate production e. g. integrally when the plate is molded or stamped or embossed or vacuum formed.

The polymer can be one according to the state of the art, e. g. like the product "Aquivion", a trademark of Solvay or "Nexar", a trademark of Kraton.

The material can be e. g. a ionomer in form of a copolymer produced from tetrafluoroethylene, $C_2F_4$, and Ethanesulfonyl fluoride, 1,1,2,2-tetrafluoro-2-[(trifluoroethenyl)-oxy], $C_2F_3O-(CF_2)_2-SO_2F$. sulfonated block copolymer.

However, the polymers can be adapted to the desired characteristic and features.

According to the inventions, the polymer is supplied as a dispersion. The dispersion can be brought to the plate by thereby filling or covering the holes or perforations with the polymer solution by way of spray, dipping, serigraphy or any other lamination method it is obvious that the amount or efficiency of latent energy recovery depends on the surface provided by the holes or perforations, their shapes and their locations. So it is possible to adapt the heat exchanger plates to the environmental and functional conditions.

By using the highly heat conductive materials as the structural elements for the Enthalpy membrane, high sensible efficiency is ensured. By defining the perforations and choosing the polymer, high latent recovery is ensured.

The corrugation/embossing of the plats increases the exchange surface significantly The perforated or opened portions of each plate can reach 70% or more, of the total surface area e.g. mosquito screen pattern. In such a case, the surface exceeds that of a flat membrane according to the state of the art), with minimal loss of the high sensible energy recovery characteristic of the exchanger plates A Total Energy recovery efficiency of up to 85% can be reached in heating mode and 72% in cooling mode. A number of finalized plates can be stacked together to build a package which, within a frame or housing, creates a heat exchanger according to the invention.

Combined sensible and latent energy to such a high Total Energy recovery level could, in some climatic zones, eliminate the need for a sensible only heat exchanger.

The polymer can be combined with additives to manifold and magnify its attributes. It can be, for instance, efficiently anti-bacterial and can meet fire resistance requirements (UL). Its viscosity can be adjusted to achieve the optimal tunable exchange features of the plate allowing as high a moisture exchange as possible.

It is obvious that the sensible energy transfer and the latent energy transfer capabilities of the heat exchanger are tunable and adjustable. The plates are adaptable to environmental conditions by the variable mosaic geometry of the perforations. E. g. an exchanger can be designed to operate at temperature under the freezing point (−10° C.) without ice built up only by choosing the right position of the perforations and polymeric treatment of the constitutive plates.

The rigidity of the structural elements could make the plate and thereby the membrane capable of handling pressure differential up to 1 Kpa. within the exchanger. This advantage opens the door to larger exchanger constructions for commercial applications.

The invention provides a simple method for the production of energy exchanger plates allowing sensible as well as latent energy exchange. The design and the adaptability of the plates allows for the construction and design of heat exchangers which are optimized with regard to the technical requirements and/or the environmental conditions.

Stamped, corrugated, embossed or vacuum formed aluminium, stainless steel, resin based plates and/or plastic plates can be made using proven automation technologies including the assembly, e. g. by vacuum grip, and seal, e. g. by laser welding, ultra sound welding, folding, crimping, to obtain packages of superposed rigid plates. The plates are washable, fire resistant, antibacterial, sealed e.g. leakage proof. They have all valuable advantages that are necessary to create highly efficient heat exchangers.

The selective perforation of the plates and the air-tight casting of the mosaic polymer micro membranes allows for the construction of structural hybrid mosaic membranes. The plate perforation, too, can be performed by pre-programmed continuous laser processes, by mechanical systems like needle-roller and the like, or chemical etching processes.

Further features and aspects of the invention become obvious from the following description of the drawings. The drawings show:

FIG. 1 a top view of one example for an embodiment of an exchanger plate according to the invention and FIG. 2 a side view of the plate according to FIG. 1.

In the drawings, the same elements are designated by the same reference numbers.

An exchanger plate 1 consists of a structural rigid plate 2 made from aluminium, plastic or the like. Plate 2 has a rim 4 which is a flat sealable rim and can be deformed for sealing. Areas of the rim 4 are opened or deviated as shown by reference no. 5 to define e. g. a inlet and outlet of a flow channel.

Within the rim area, corrugations 3 are stamped or embossed into the plate 2. When similar plates are sealed together, flow channels are defined. In the example, reference no. 5 designates areas with perforations.

For the purpose of clarity, only some of the perforation areas 6 and some of the corrugated areas 3 are designated.

The heat exchanger element 1 shows a great surface for heat exchange which is increased by the corrugations 3 which are corrugated in one direction only and open on the other surface. Furthermore, the perforated areas 6 define a latent energy exchange area for the transfer of moisture.

These plates will be stacked to build a heat exchanger e. g. for ventilation systems to exchange heat from outgoing to incoming air (or vice versa for free cooling in summer) as well as humidity from outgoing to incoming air in winter (or vice versa for moisture reduction in summer or ail year round in hot and humid climatic zones).

The drawings and the description do in no way restrict the invention and are meant for describing an example, only.

REFERENCE NUMERALS 1 heat exchanger element
2 plate
3 corrugation
4 border
5 opened border
6 perforations

The invention claimed is:

1. A method for the production of heat exchanger elements of a type for use in a residential or commercial total energy exchanger comprising:
   a) producing a plate element with defined outer dimensions and corrugations in the area within a border, wherein the plate element is made from a material having sensible energy recovery capability;
   b) perforating the plate in predefined areas and in predefined dimensions, wherein said perforated area provides a plurality of holes allowing the water vapor to migrate from one side of the plate material to the other side;
   c) filling the perforations with a polymer with latent energy recovery capability, the filling being performed while the polymer is in a dissolved state, the polymer being selected to provide latent energy recovery of a residential or commercial space during a ventilation process where stale exhaust air and incoming fresh air travel through the heat exchanger; and
   d) curing the polymer onto the plate for forming a polymer layer within the perforations;
   wherein the polymer is a sulfonated block copolymer and the heat exchanger element is configured for placement in a total energy recovery ventilator (ERV), whereby the heat exchanger element exchanges heat as well as moisture with respect to air that flows in contact with the heat exchanger element.

2. The method according to claim 1, wherein the plate is aluminum.

3. The method according to claim 1, wherein the plate is plastic.

4. The method according to claim 1, wherein the plate is stamped.

5. The method according to claim 1, wherein the plate element has a first face and an opposite second face, wherein the corrugations are formed in one direction only along the first face, while being open along the opposing second face, wherein the plate element comprises a single layer structure.

6. The method according to claim 1, wherein the plate is molded.

7. The method according to claim 1, wherein the plate is perforated by a needle-roller process.

8. The method according to claim 1, wherein the perforation is formed during formation of the plate element.

9. A heat exchanger element comprising a plate element with defined outer dimensions and corrugations to increase the exchange surface in the area within a border, said border being defined by a peripheral rim that extends completely around the area containing the corrugations, the peripheral rim including a first portion that is open along a corresponding edge of the plate and defines one of an inlet and an outlet of a flow channel, the first portion lying in a different plane relative to adjacent portions of the peripheral rim so as to represent a locally deformed area of the peripheral rim, said inlet or outlet of the flow channel being spaced from the corrugations and is therefore only defined by a non-corrugated portion of the plate, the plate element being further defined by a first face and a second face, said plate element being made from a material having sensible energy recovery capability, and said plate element has perforations in predefined first areas and in predefined dimensions, each perforated area providing a plurality of perforations, each perforation being made so as to extend from the first face to the second face, said perforations being filled with a polymer with latent energy recovery capability, wherein the polymer comprises a sulfonated block copolymer that has a water vapor transmission rate suitable for use in a total energy recovery ventilator (ERV).

10. The heat exchanger element according to claim 9, wherein the perforations are small holes.

11. The heat exchanger element according to claim 10, wherein the perforated areas sum up to 70% of the total surface of the plate element.

12. The heat exchanger element according to claim 9, wherein the plate element has a border which allows a gastight connection to another similar plate element.

13. The heat exchanger element according to claim 9, wherein the plate element has corrugations increasing the exchange surface up to 100% relative to the exchange surface of a non-corrugated plate element.

14. The heat exchanger element according to claim 9, wherein the corrugations are oriented to guide a fluid flow.

15. The heat exchanger with at least three plates like heat exchanger elements fixed to each other in parallel orientation to form two fluid paths allowing fluids to flow there through, wherein the plate like heat exchanger elements are elements according to claim 9.

16. A method for the production of an energy recovery ventilator (ERV) that is defined by a plurality of heat exchanger elements comprising:
 a) producing a plurality of plate elements, each plate element having defined outer dimensions and corrugations in the area within a border that extends completely around the area containing the corrugations, wherein the plate element is made from a material having sensible energy recovery capability, wherein the entire border is free of corrugations and defines free edges of the plate element;
 b) perforating the plate in predefined areas within the border and in predefined dimensions and locations, wherein said perforated area provides a plurality of holes;
 c) filling the perforations with a polymer with high latent energy recovery capability, the filling being performed while the polymer is in a dissolved state and by a technique that results in the polymer being directed into the perforations, wherein said plurality of holes when filled with the polymer allows the water vapor to migrate from one side of the plate material to the other side;
 d) curing the polymer onto the plate for forming a polymer layer within the perforations; and
 e) combining the plurality of plate elements in stack form to define the energy recovery ventilator that is configured for residential and commercial applications to receive both exhaust air and incoming air, wherein the plurality of plate elements are constructed to act upon both the exhaust air and the incoming air by heat and moisture exchange therebetween.

17. The method of claim 16, wherein the technique comprises serigraphy.

18. The method of claim 16, wherein the technique comprises dipping or spraying.

19. A method for the production of heat exchanger elements comprising:
 a) identifying environmental conditions in which the heat exchanger elements are to be placed for use;
 b) producing a plate element that is made from a material having sensible energy recovery capability;
 c) selectively perforating the plate in predefined areas and in predefined dimensions, wherein said perforated area is selected based upon the environmental conditions and provides a plurality of holes allowing the water vapor to migrate from one side of the plate material to the other, wherein the plurality of holes are arranged in a first pattern for use in first environmental conditions and are arranged in a second pattern for use in second environmental conditions different than the first environmental conditions, the first pattern being different than the second pattern;
 d) individually filling the perforations with a polymer with latent energy recovery capability characterized by high water vapor transmission rate, the filling being performed while the polymer is in a dissolved state, wherein the polymer comprises a sulfonated block copolymer; and
 e) curing the polymer so as to form a plurality of discrete polymer micro membranes located within corresponding perforations of the plate elements;
 wherein the heat exchanger element is configured for placement in an energy recovery ventilator (ERV) and is constructed to act upon both incoming air and exhaust air, by heat and moisture exchange therebetween, depending upon environmental conditions.

20. The method of claim 19, wherein the plate element is defined by a first face and a second face, each perforation being open along the first face and the second face prior to the step of filling the perforations.

21. The method of claim 19, wherein the plate element further includes corrugations in any areas within a border of the plate element.

22. The method of claim 19, wherein the plate element is plastic and the polymer is a sulfonated block copolymer.

23. The method of claim 21, wherein the corrugations are formed using a thermos/vacuum forming process.

24. The method of claim 16, wherein the border includes opposing free ends of the plate element that lie within the same plane and are configured to sealingly seat against an adjacent plate.

25. The method of claim 1, wherein the plate element is configured to operate in conditions below a freezing point of water without ice buildup by selecting a pattern and locations for the perforations formed in the plate element and by selecting the polymer in view of these operating conditions.

26. The method of claim 1, wherein the polymer further includes an anti-bacterial additive.

27. The method of claim 1, wherein the sulfonated block copolymer has at least one end block A, which is resistant to sulfonation, and at least one interior block B, which is susceptible to sulfonation.

* * * * *